Nov. 7, 1967  R. TURIBLE  3,351,152
STEERING GEARS FOR VEHICLES
Filed March 28, 1966  2 Sheets-Sheet 1

Inventor
René Turible
by Michael S. Striker
Attorney

Nov. 7, 1967    R. TURIBLE    3,351,152
STEERING GEARS FOR VEHICLES
Filed March 28, 1966    2 Sheets-Sheet 2

United States Patent Office 3,351,152
Patented Nov. 7, 1967

3,351,152
STEERING GEARS FOR VEHICLES
René Turible, Nanterre, France, assignor to Societe des Engrenages Durand, Paris, France, a corporation
Filed Mar. 28, 1966, Ser. No. 537,760
Claims priority, application France, Mar. 31, 1965, 11,347
4 Claims. (Cl. 180—79.1)

ABSTRACT OF THE DISCLOSURE

A steering gear for controlling the orientation of the wheels of a vehicle constructed and arranged in such a manner to permit the orientation of the wheels either by power steering or by manual turning of the steering wheel.

---

Figure 1:
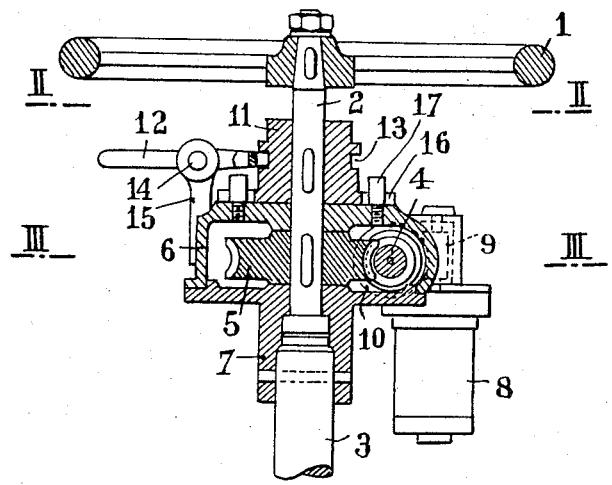

The present invention relates to steering gears of the type intended for controlling the angular position of the steering-wheels of a vehicle.

It is known that power assisted steering gears are particularly useful in the case of heavy vehicles. On the other hand, in middle-weight vehicles this power assistance is completely useless when the vehicle is driven normally. In the case of middle-weight vehicles such a device would be useful only when the vehicle is stationary, that is, in practice, during parking and garage maneuvers in short spaces as frequently observed in towns.

Under these conditions, the present invention has for its object a steering gear comprising a driving system simpler than conventional power-assisting devices and adapted to be temporarily engaged when necessary, for example for parking and garage maneuvers.

To this end the present invention provides a steering gear for vehicle which comprises a device for rotating the steering column, this device being intended for exceptional use only, for example for parking and garage maneuvers, this steering gear being characterized in that the shaft of the steering wheel is independent of the steering column and that between said shaft and said steering column there is mounted a non-reversible worm and wheel reducing gear operatively connected to a small driving motor, one of the following two component elements of this reducing gear, namely its case or its wheel tangent to the worm, being rigid with the steering-wheel shaft, the other component element being rigid with the steering column, whereby the driver can cause the steering column to be driven from said motor by simply retaining the steering wheel in order to hold against motion the reducing gear element rigid therewith.

According to a first form of embodiment, the tangent wheel of the reducing gear is rigid with the steering wheel shaft but the case of the same reducing gear is rigid with the steering column. Under these conditions, when the driver wishes to drive the steering column by means of the servo motor he simply holds the steering wheel against motion so that the tangent wheel of the reducing gear is held against rotation. In fact, the driving action exerted by the motor on the reducing gear will thus cause the case of this reducing gear and therefore the steering column to rotate.

Under normal driving conditions, rotating the steering wheel will cause the tangent wheel and therefore the complete reducing gear to rotate, since the latter is not reversible. Thus, the steering column is rotatably driven.

However, it may be advantageous to provide some clutch means for rotatably connecting at will the steering wheel shaft directly with the case of the reducing gear under normal driving conditions.

According to another form of embodiment of the steering gear of this invention, the case of said reducing gear is rigid with the steering wheel shaft and the tangent wheel of said reducing gear is rigid with the steering column. The operation of the corresponding assembly is the same as in the preceding form of embodiment.

Figure 2:
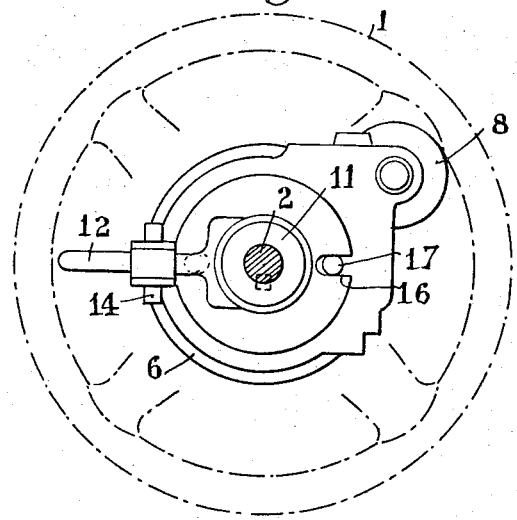
Figure 3:
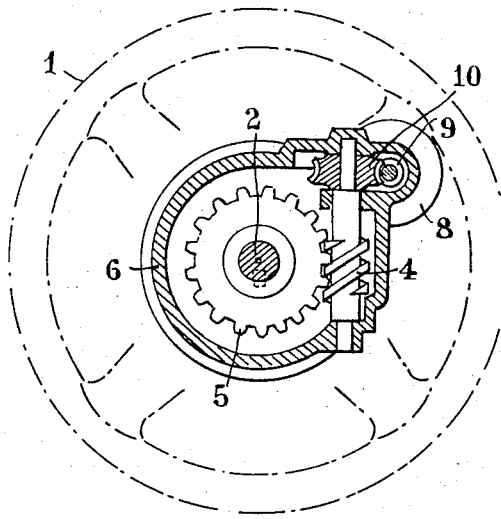
Figure 4:
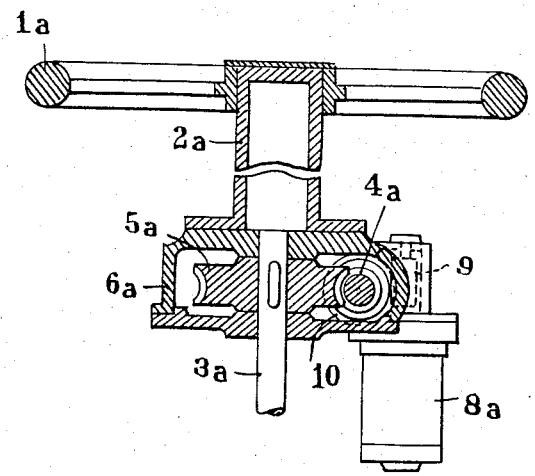

These two forms of embodiment will now be described by way of example with reference to the accompanying drawing, in which:

FIGURE 1 is a vertical section showing a first form of embodiment;
FIGURES 2 and 3 are sections taken respectively upon lines II—II and III—III of FIGURE 1, and
FIGURE 4 is a vertical section concerning another form of embodiment.

Referring first to the form of embodiment of the invention which is illustrated in FIGURES 1, 2 and 3 of the drawing, the steering gear comprises a steering or control wheel 1 having a shaft 2 rigid therewith and independent of the steering column proper 3 which controls the orientation of the front wheels or like steering wheels of the corresponding vehicle.

However, this steering gear comprises a non-reversible reducing gear of the worm and wheel type, the non-reversibility of this reducing gear being simply due to the magnitude of the reduction ratio provided between the worm 4 and the tangent wheel 5 meshing therewith. The case 6 of this reducing gear is rotatably rigid with the steering column 3 by having a socket portion 7 keyed or otherwise fastened thereon. On the other hand the tangent wheel 5 of said reducing gear is keyed to the steering wheel shaft 2.

The worm 4 of said reducing gear is drivingly connected to a small motor 8, preferably an electromotor. The coupling between the motor shaft and worm 4 may be effected for example by means of another worm 9 rigid with the motor shaft and meshing with a tangent wheel 10 rigid with the shaft of said first worm 4.

On the other hand, clutch means are provided whereby the steering wheel shaft 2 can be coupled directly to the aforesaid case 6 of the reducing gear. This clutch means consist in this example of a hub 11 slidably mounted on, but rotatably solid with, shaft 2, by the use of keys or splines. The axial movements of this sliding hub are controlled by means of a handlever 12 comprising a forked end having its two arms engaged in a circular groove 3 formed in said sliding hub 11. This handlever 12 is fulcrumed about a horizontal pin 14 carried by a bracket 15 rigid with the case 6 of the reducing gear. The sliding hub 11 carries at its lower end a flange 16 formed with a pair of diametral notches engageable by a corresponding pair of studs 17 carried by said case 6.

Under normal driving conditions the sliding hub 11 is in its lowermost position (as shown in FIGURE 1) whereby the studs 17 engage the corresponding notches formed in the lower flange 16 of said hub. Thus, the steering wheel shaft 1 is rotatably rigid with the case 6 of the reducing gear and therefore with the steering column 3 which is thus rotatably driven directly from the steering wheel 1.

When the driver wishes to drive the steering column 3 by means of the servo motor 8, it is firstly necessary to disconnect the steering wheel shaft 2 from the case 6 of the reducing gear by lifting the sliding hub 11 by means of its control handlever 12. Then the driver simply retains manually the steering wheel 1 so as to hold the tangent wheel 5 of the reducing gear against rotation while controlling the energization of the servo motor 8 in the proper direction. In fact, the worm 4 is thus rotatably driven and reacts against the wheel 5 held against rotation, whereby the case 6 and therefore the steering coumn 3 are rotatably driven.

Preferably, the energization of the motor 8 is controlled by means of a know of the hand or pedal-actuated type. The control system is so arranged that when said knob is actuated the motor 8 and therefore the steering column 3 rotates in one or the other direction.

The electromotor 8 is energized for example by means of rotary contacts mounted on the steering column. Preferably, when the sliding hub 11 is allowed to drop to its lowermost position its control lever 12 may be adapted to engage a contact for automatically stopping the motor 8, the steering gear thus resuming its normal condition.

Also preferably, a safety switch is provided to prevent the driver from starting the steering gear servo motor 8 when the vehicle speed exceeds a predetermined relatively low value corresponding to the maximum speed at which the vehicle can reasonably be operated for parking and similar maneuvers. Thus, any risk of untimely energizing the motor 8 when the vehicle is driven at normal speed is safely avoided.

However, it should be noted that the clutch means consisting of the above-described sliding hub 11 may be dispensed with, if desired. In fact, since the reducing gear 4, 5 is non-reversible, actuating the steering wheel 1 will cause the complete reducing gear to revolve bodily with its case 6, even if the steering wheel shaft is not rigidly connected to this gear case.

FIGURE 4 illustrates another form of embodiment of the steering gear of this invention. In this modified construction the shaft 2a of the steering wheel 1a is also independent of the steering column 3a. There is also provided a nonreversible reducing gear comprising a worm 4a and a tangent wheel 5a, this worm 4a being operatively connected to a small electromotor 8a rigid with the case 6a of said reducing gear.

However, in this alternate form of embodiment this case 6a is rigid with the steering wheel shaft 2a and the tangent wheel 5a of the reducing gear is rigid with the steering column.

On the other hand, in this construction no clutch means is provided between the case 6a of the reducing gear and the steering column 3a. However, under normal driving conditions, turning the steering wheel 1a will cause a corresponding rotation of the steering column 3a. In fact, when the steering wheel 1a is rotated the case 6a of the reducing gear is also rotated and since the reducing gear is not reversible this case will carry along the wheel 5a through the worm 4a.

When under particular circumstances, it is desired to control the rotational movements of the steering column by means of the servo motor 8a, for example in parking and garage maneuvers, the driver simply retains the steering wheel 1a to hold the case 6a of the reducing gear against rotation. Then, the motor 8a can be energized for rotating the steering wheel 5a and the steering column 3a in the desired direction.

Of course, this invention may be carried out in different manners, for example, by mounting the reducing-gear and motor assembly in the vicinity of the control knob, instead of near the steering wheel, but many other modifications may be contemplated without departing from the spirit and scope of the invention as set forth in the appended claims.

What I claim is:

1. A steering gear for controlling the orientation of the wheels of a vehicle comprising, in combination, a steering column controlling the orientation of the wheels; a steering wheel; a rotary shaft rigid with said steering wheel but independent of said column; a non-reversible reducing gear comprising a worm, a worm wheel member meshing with said worm and a gear case member housing said worm and said wormwheel member, said worm rotatably mounted on said gear case member and one of said members being rigidly secured to said shaft rigid with said steering wheel and the other of said members being rigidly secured to said steering column; and a motor mounted on said gear case member and drivingly connected to said worm of said reducing gear.

2. A steering gear as defined in claim 1, wherein said gear case member is rigidly secured to said column and said wormwheel member is rigidly secured to said shaft.

3. A steering gear as defined in claim 1, wherein said gear case member is rigidly secured to said shaft and said wormwheel member is rigidly secured to said column.

4. A steering gear as defined in claim 1, and including clutch means disposed between said gear case member and that element of said steering gear which is rotatably rigid with said wormwheel of said reducing gear, said clutch means being movable to a disengaged position when it is desired to cause said steering column to be driven from said motor drivingly connected to said worm of said reducing gear.

References Cited

UNITED STATES PATENTS

| | | | |
|---|---|---|---|
| 2,761,326 | 9/1956 | Herbenar et al. | 180—79.1 |
| 2,967,980 | 1/1961 | Ovshinsky | 180—79.3 |
| 3,191,109 | 6/1965 | Hepner | 180—79.1 |

BENJAMIN HERSH, *Primary Examiner.*

J. H. BRANNEN, *Assistant Examiner.*